Figure 5:
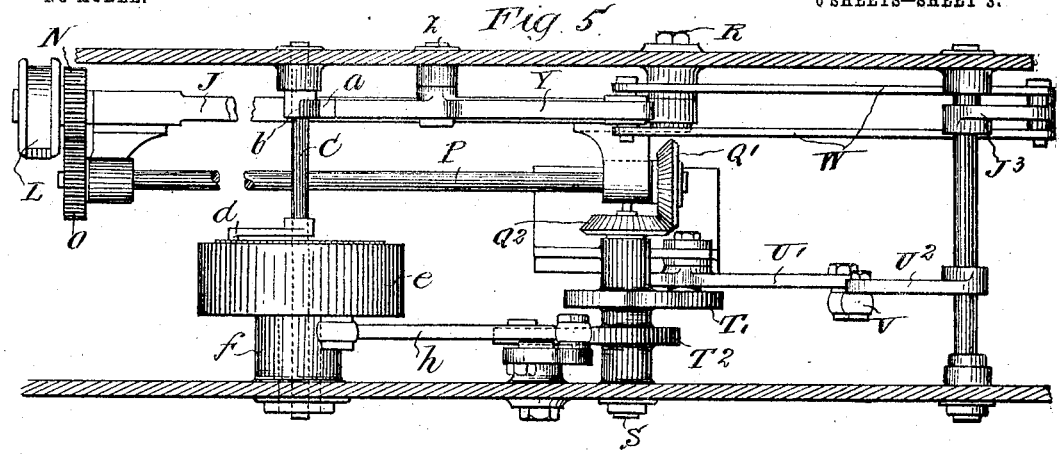

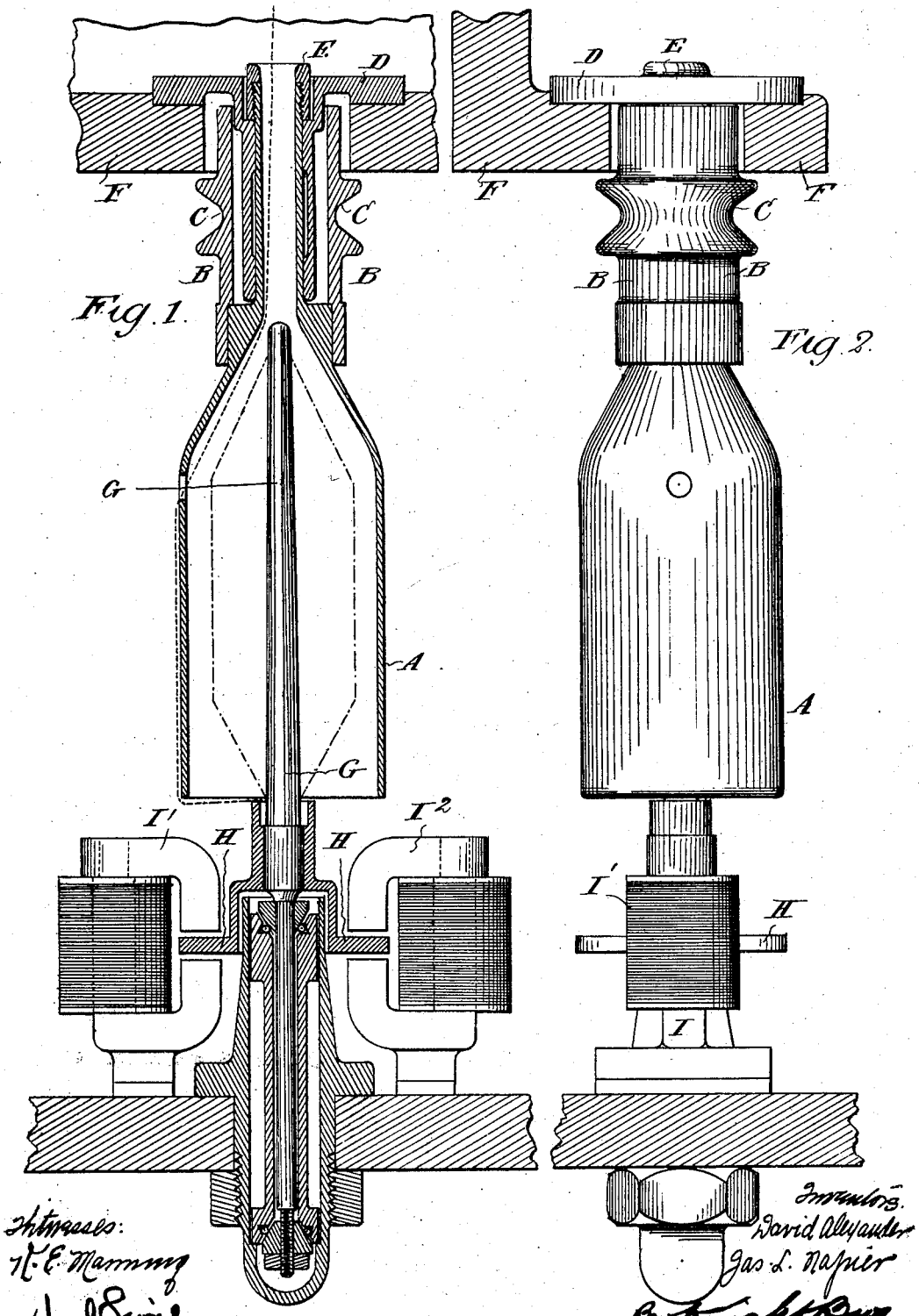

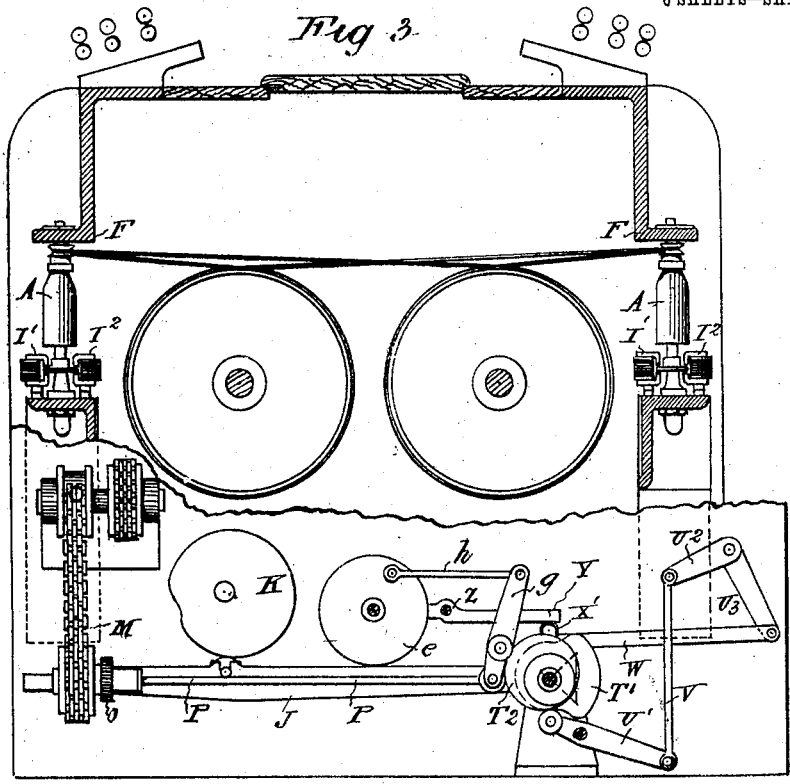
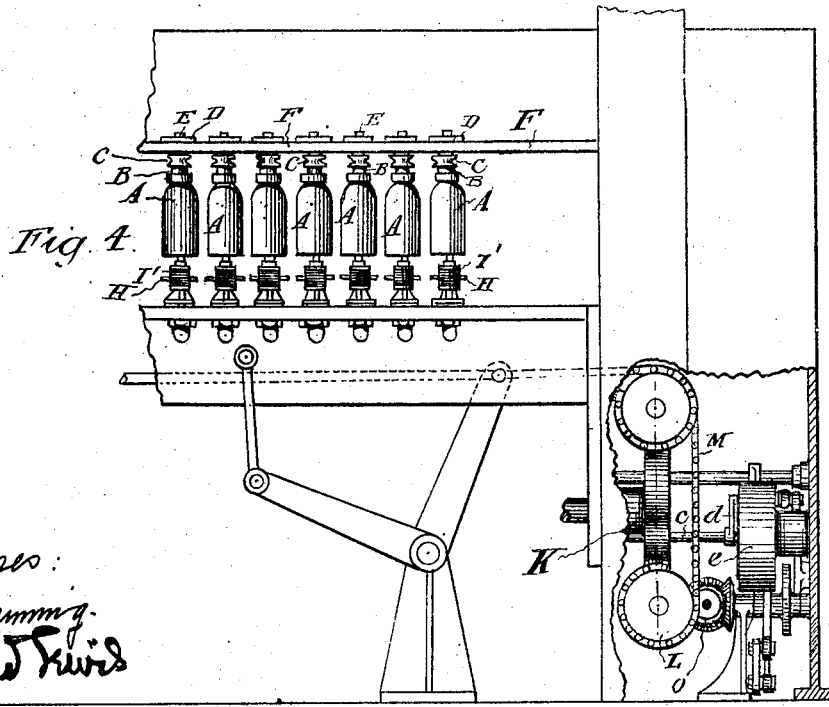

No. 775,549. PATENTED NOV. 22, 1904.
D. ALEXANDER & J. L. NAPIER.
SPINNING MACHINE.
APPLICATION FILED NOV. 5, 1902.
NO MODEL. 6 SHEETS—SHEET 3.

No. 775,549. PATENTED NOV. 22, 1904.
D. ALEXANDER & J. L. NAPIER.
SPINNING MACHINE.
APPLICATION FILED NOV. 5, 1902.
NO MODEL. 6 SHEETS—SHEET 4.

Witnesses:
Inventors:
David Alexander
Jas. L. Napier
By Knight Bros.
attys

No. 775,549. PATENTED NOV. 22, 1904.
D. ALEXANDER & J. L. NAPIER.
SPINNING MACHINE.
APPLICATION FILED NOV. 5, 1902.
NO MODEL. 6 SHEETS—SHEET 5.

Witnesses:
N. E. Manning
Harold Lewis

Inventors:
David Alexander
Jas. L. Napier
By Knight Bros
Attys.

No. 775,549. PATENTED NOV. 22, 1904.
D. ALEXANDER & J. L. NAPIER.
SPINNING MACHINE.
APPLICATION FILED NOV. 5, 1902.
NO MODEL. 6 SHEETS—SHEET 6.

No. 775,549. Patented November 22, 1904.

UNITED STATES PATENT OFFICE.

DAVID ALEXANDER AND JAMES LANGMUIR NAPIER, OF GLASGOW, SCOTLAND.

SPINNING-MACHINE.

SPECIFICATION forming part of Letters Patent No. 775,549, dated November 22, 1904.

Application filed November 5, 1902. Serial No. 130,199. (No model.)

*To all whom it may concern:*

Be it known that we, DAVID ALEXANDER, electrical engineer, of 142 Holland street, and JAMES LANGMUIR NAPIER, consulting engineer, of 55 West Regent street, Glasgow, Scotland, have invented certain new and useful Improvements in Spinning-Machines, of which the following is a specification.

This invention has for its object the construction of a spinning-frame generally upon the lines of the ordinary ring-spinning frame, but so designed as to admit of a positive adjustment of the tension upon the yarn throughout the whole period of winding the yarn upon the spindle in order that the tension may be constant, and particularly thereby to facilitate the winding of cops of any convenient diameter upon the bare spindle or on paper tubes.

In carrying out our invention we make use of the braking effect of eddy-currents generated in a disk of copper or other non-magnetic metal (constituting practically a short-circuited armature) when revolved in a magnetic field. We vary this braking effect by the employment of electromagnets, the current through the coils of the magnets being varied and controlled by suitable mechanism embodied in the spinning-frame. The ring and traveler of the ordinary ring-spinning frame are replaced by a suitable flier. According to our invention the flier may be driven and the brake placed on the spindle, or the spindle may be driven and the brake placed upon the flier.

In order to illustrate our method of spinning, we have prepared six sheets of drawings, of which—

Figures 1 and 2, Sheet 1, represent, respectively, a section and elevation of a suitable spindle and flier controlled according to our invention. In these figures the flier is shown driven and the brake is applied to the spindle. We prefer this method in order that the twist of the yarn may be uniform throughout. For fine yarns we prefer to carry the spindle or ball-bearings, as shown. For the coarser yarns the ordinary conical bearings may be adopted.

Figs. 3 and 4, Sheet 2, represent, respectively, a sectional end view and a part front elevation of a spinning-frame constructed according to our invention. The drawings show these parts differing essentially from the corresponding parts of an ordinary ring-spinning frame.

Figure 6:
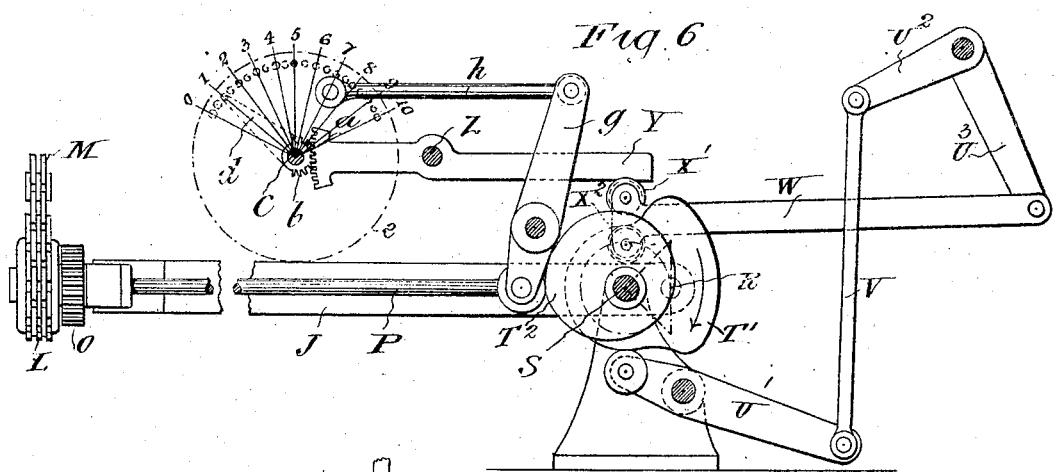
Figure 7:
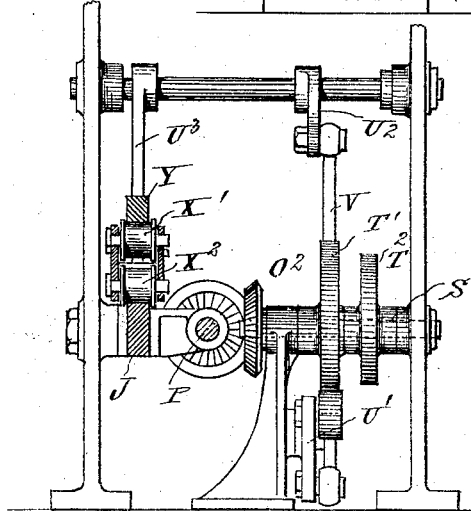

Figs. 5, 6, and 7, Sheet 3, show, respectively, a plan, side elevation, partly in section, and sectional end view of one form of gear designed to regulate the current passing through the coils of the magnets. In Fig. 6 the resistance-box is assumed to be removed and is shown in dotted lines.

Figure 8:
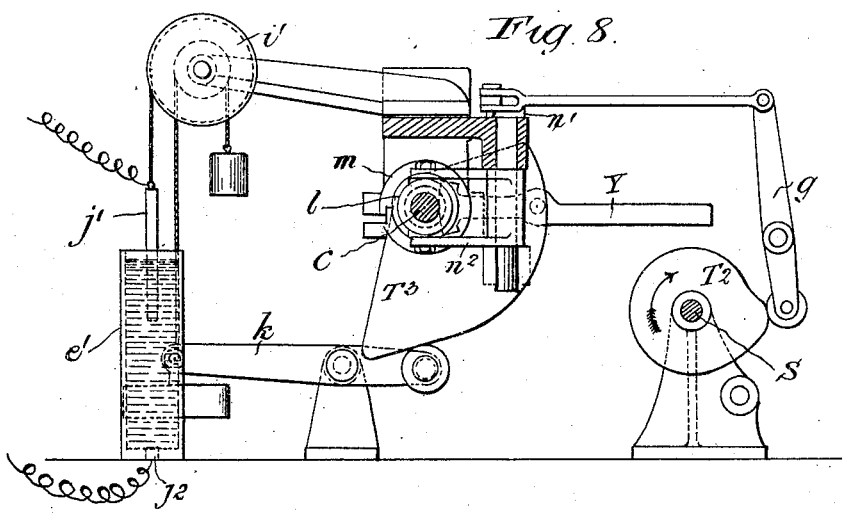
Figure 9:
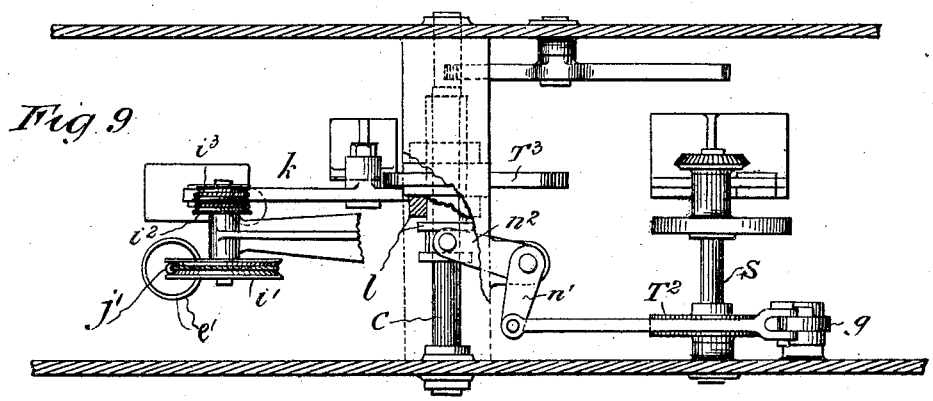
Figure 10:
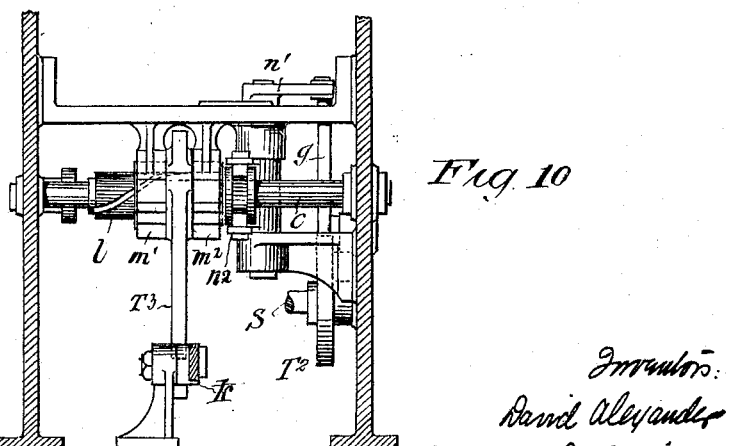

Figs. 8, 9, and 10, Sheet 4, show, respectively, a side elevation, a plan, and an end elevation of an alternative form of gear which may be used instead of that shown in Sheet 3.

Figure 11:
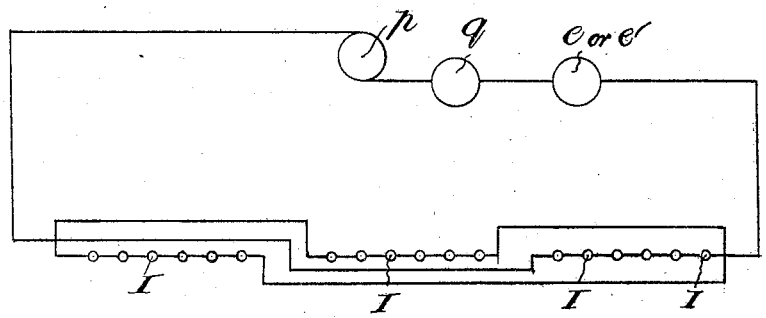

Fig. 11, Sheet 5, is a wiring diagram intended to show the electrical connections in a spinning-frame constructed according to our invention.

Figure 12:
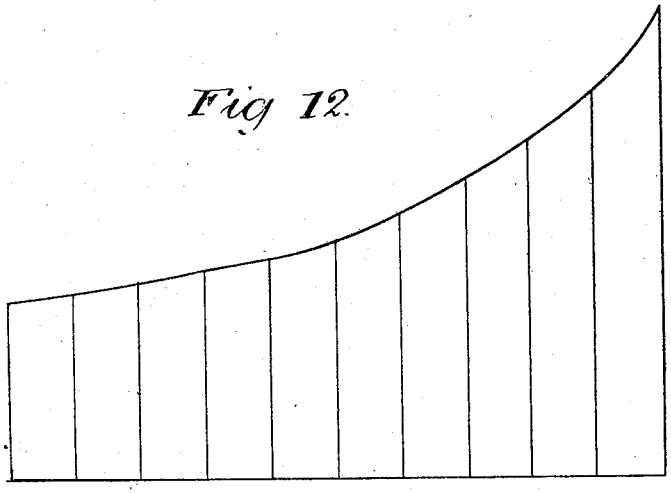

Fig. 12, Sheet 5, is a characteristic diagram showing by means of a curve the current required in the coils of the magnets at the variable speeds of a spindle, such as that shown in Fig. 1, for a constant tension, a constant rate of winding, and a constant speed of flier. In the diagram abscissæ represent speeds of spindle and ordinates the current required in the coils of the magnets.

Figure 13:
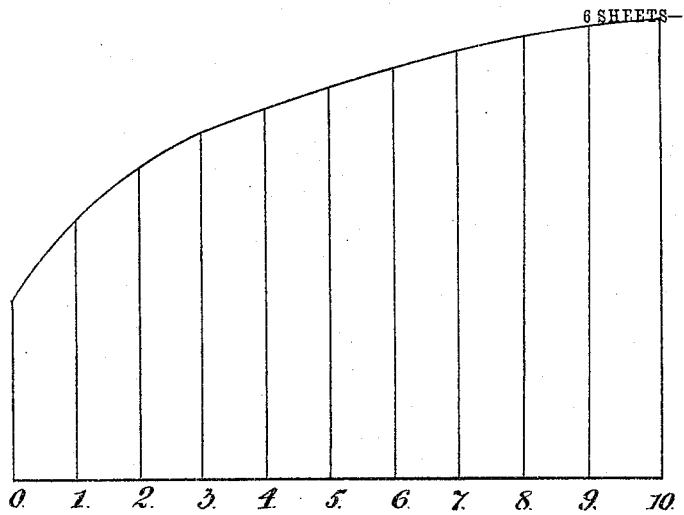

Fig. 13, Sheet 6, shows the same current-curve plotted with cop-diameters for abscissæ, the variation in spindle-speed depending on the variable radius at which the yarn is wound on the cop.

Figure 14:
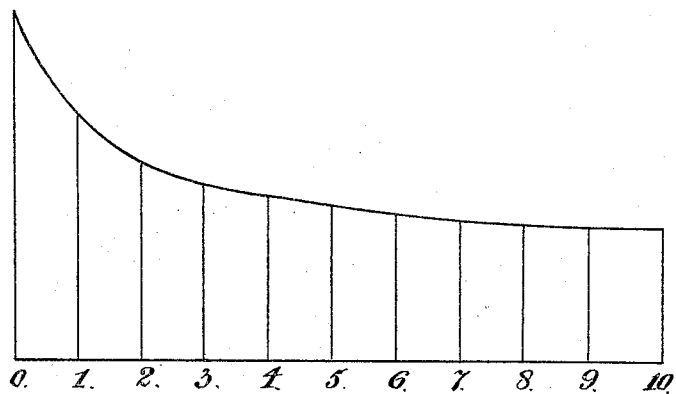

Fig. 14 is deduced from Fig. 13 and shows the characteristic form of the variable-resistance curve, cop-diameters being abscissæ and resistances ordinates. This curve shows the resistance which should exist in circuit at the moment at which the yarn is being wound at any given cop-diameter.

Figure 15:
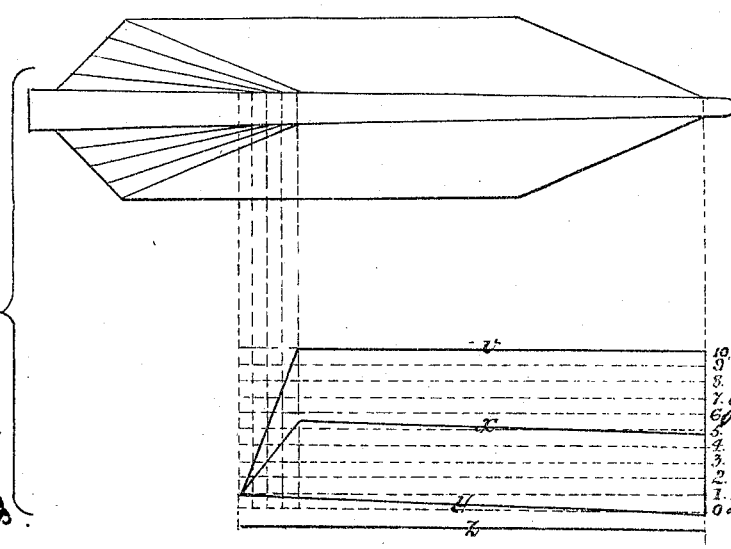

Fig. 15 shows the outline of a cop at various stages of its building. The line $z$ in the lower part of the diagram indicates the total travel (as distinguished from the vertical oscillation) of the lifting-rail during the formation of a cop, and the vertical height contained between the lines $v$ and $y$ at any point along the line $z$ indicates the variation of cop-diameter at the corresponding point of travel of the lifting-rail during the winding on of the layer of yarn corresponding to that point. The mean cop-diameter at any point in the travel of the lifting-rail is shown by the line $x$.

In Figs. 13 and 14 the numbers 1 2 3, &c., represent the same stages of cop-diameter as the corresponding numbers in Fig. 15.

In the various figures the same characters are used to indicate the same parts.

In Figs. 1 and 2, Sheet 1, A is a revolving ring or flier, preferably made bottle-shaped, as shown. B is a sleeve rigidly attached to the flier and carrying a wharf or pulley C. The interior of this sleeve forms an oil-reservoir. An extension of the flier passes through the bearing D and is supported by the nut E. The bearing D is carried by the fixed rail F of the spinning-frame. G is the spindle carried on the lifting-rail and preferably mounted in ball-bearings, as shown. H is a disk of hard copper or other non-magnetic metal rigidly attached to and revolving with the spindle. $I'$ and $I^2$ are electomagnets the poles of which embrace but are not in contact with the surface of the disk.

In a spinning-frame constructed according to our invention and as shown in the drawings the yarn is passed by a suitable bodkin through the side of the flier and its hollow spindle and is attached to the spindle and the drawing-rollers in the ordinary way. The course of the yarn is shown by a dotted line in Fig. 1, Sheet 1. The flier being driven as shown in Fig. 3, the pull of the yarn causes the spindle also to revolve at such a rate as will allow the yarn to be wound upon the spindle as it is given off from the drawing-rollers. A current of electricity of varying intensity is passed through the coils of the electromagnets I, and the effect of the revolution of the copper disk H in the field of the magnets is to generate eddy-currents in the body of the disk, which exercise a braking effect on the disk and spindle. The pull of the yarn due to the resistance of the spindle is maintained constant by means of apparatus to be more fully described, which vary the current passing through the coils of the electromagnets, and thereby vary the braking effect of the eddy-currents generated in the disk.

Referring to Figs. 5, 6, and 7, Sheet 3, J is the lever controlling the building of the cop and is caused to oscillate vertically about its fulcrum by the revolution of a heart-shaped cam K. (See Figs. 3 and 4.) These parts are common to the ordinary ring-spinning frame, as is also the chain-pulley L, carried by the lever J, and which is caused by the ordinary mechanism (not shown in the drawings) to revolve about its axis and so lengthen or shorten the chain M in order to produce the travel of the lifting-rail. The wheel N revolves with the chain-pulley L and drives the pinion O, the shaft P, and the bevel-wheels $Q'$ and $Q^2$. The shaft P is carried by suitable brackets attached to the lever J, and the bevel-wheels $Q'$ and $Q^2$ are so arranged that the plane of the pitch-line of the wheel $Q'$ shall pass through the center of the fulcrum R of the lever J in order that the vertical oscillation of the lever J may communicate no turning motion to the bevel-wheel $Q^2$. The bevel-wheel $Q^2$ drives the shaft S, carrying two cams $T'$ and $T^2$. Of these the cam $T'$ by means of the levers $U'$, $U^2$, and $U^3$ and the rod V communicates motion to the frame W, which carries two rollers $X'$ and $X^2$, forming a distance-piece between the levers J and Y. The lever Y is pivoted at Z and by means of the toothed sector $a$ and the pinion $b$ communicates motion to the shaft $c$, carrying the contact-piece $d$. The resistance-box $e$ is concentric with the shaft $c$ and is carried in the bearing $f$, being capable of a turning movement about its center independent of the shaft $c$. The angular movement of the resistance-box $e$ is governed by the cam $T^2$, which communicates its motion to the resistance-box $e$ by means of the lever $g$ and the rod $h$. The lever Y will vibrate in unison with the lever J, the amplitude of its vibrations being governed by the position of the frame W. When the frame W is in the position shown in the drawings—that is, near the fulcrum R and far from the fulcrum Z—then the motion of the lever Y will be least. As the movement of the cam $T'$ causes the frame W to recede from the fulcrum R and approach the fulcrum Z then the motion of the lever Y will be greater and the contact-piece $d$ will vibrate through a larger arc on the resistance-box $e$. The cam $T'$ is so shaped that at any point in the travel of the lifting-rail it will place the frame W in such a position between the fulcrum R and Z as to cause the motion of the lever Y, and therefore the vibration of the contact-piece $d$, to have an amplitude corresponding to the extreme variation of cop-diameter during the winding on of the layer of yarn corresponding to that point in the travel of the lifting-rail.

The coils of the resistance-box $e$ are arranged in proportion to the ordinates of the curve in Fig. 14—that is, that when the contact-piece $d$ is at point 1, 2, or 3, &c., on the resistance-box the resistance in circuit is proportional to the ordinate at point 1, 2, or 3, &c., in Fig. 14. As the curve in Fig. 14 is not a straight line, it is necessary that the contact-piece $d$ should vibrate on the portion of the resistance-box corresponding to the particular extremes of cop-diameter at any point of the travel of the lifting-rail. This is effected by the cam $T^2$, which by imparting angular motion to the resistance-box, as described, insures that the mean point of the vibration of the contact-piece $d$ with relation to the resistance-box $e$ shall correspond with the mean cop-diameter, as shown in Fig. 15, for any position of the lifting-rail. The cam $T'$ therefore determines the extent of the vibration of the contact-piece $d$, and the cam $T^2$ determines the initial point of each vibration.

All levers are maintained in contact with their respective cams by springs or weights. (Not shown on the drawings.)

Figs. 8, 9, and 10, Sheet 4, show, respectively, a plan, side elevation, and end elevation of an alternative method of regulating the current in the coils of the electromagnets I by means of a liquid resistance $e'$. In these figures the cam $T'$, the levers $U'$, $U^2$, and $U^3$, the rod V, and the frame W are not shown, being similar to those in Figs. 5, 6, and 7. The lever Y is controlled in the same manner as in Figs. 5, 6, and 7 and imparts angular motion to the shaft $c$, carrying the cam $T^3$, which, through the lever $k$ and the pulleys $i'$, $i^2$, and $i^3$, regulate the liquid resistance intervening between the conductors $j'$ and $j^2$. The cam $T^3$ is so shaped that for equal variations of cop-diameter the conductor $j'$ shall rise and fall, so that the liquid resistance shall vary in proportion to the ordinates in Fig. 14. The shaft $c$ carries a helical feather engaging with a helical groove in the sleeve $l$. This sleeve carries a straight feather engaging in a groove in the cam $T^3$, which is supported in the bearings $m'$ $m^2$. The sleeve $l$ can be moved longitudinally with relation to the shaft $c$ and with relation to the cam $T^3$ by means of the levers $n'$ $n^2$, operated by the cam $T^2$ and the lever $g$ and the rod $h$. Such longitudinal movement of the sleeve $l$ causes the cam $T^3$ to revolve with relation to the shaft $c$, and therefore determines the initial point of the rise or fall of the conductor $j'$, such rise or fall corresponding to the vibratory movement of the contact-piece $d$ in Figs. 5 and 6.

In the wiring diagram Fig. 11, $p$ is the dynamo or other source of electricity. $q$ is a regulating-switch, which may be added to spinning-frames on which it is desired to spin various counts of yarn. The purpose of this switch, which is maintained in position throughout the whole building of a set of cops, is to regulate the current delivered to the variable resistance $e$ or $e'$, and so reduce or increase the tension on the yarn throughout the whole operation of spinning. $e$ or $e'$ is a variable resistance. (Shown in Sheets 3 and 4.) I I represent the electromagnets arranged in series in such numbers as may be suitable to the voltage of the electricity-supply.

The precise form of the curves shown in Figs. 12, 13, 14, and 15, and consequently of the cams shown in Sheets 3 and 4, will vary with the speed of revolution of the driving spindle or flier and with the proportions of the cops intended to be formed; also with the dimensions of the magnets and brake-disks used.

We claim—

1. In a spinning-machine, the combination with the revolving spindle and revoluble means for guiding the yarn around the spindle, of means for revolving one of said parts, a non-magnetic disk on the other part, an electric magnet for creating eddy-currents in the revolving disk by creating about it a magnetic field, and means for varying the intensity of the magnetic field in which the disk revolves.

2. In a spinning-machine, the combination of the movable rail, a revoluble spindle mounted thereon, an oscillating lever connected with the movable rail, a shaft supported by the oscillating lever and rotated thereby, a bevel-gear on the end of the shaft, having the plane of its pitch in a line with the center of the fulcrum of the oscillating lever, two cams operated by said shaft, a second oscillating lever mounted adjacent the first-mentioned oscillating lever, a frame controlled by one of the cams and movable toward the fulcrum of one of the levers and away from the fulcrum of the other lever, so that when the first-mentioned lever is moved the second lever will be moved a distance proportionate to the position of the frame on the levers, a rotatable contact-piece moved by the second lever, and a rotatable resistance moved by the second cam, substantially as described.

In testimony whereof we have hereunto affixed our signatures in presence of two witnesses.

DAVID ALEXANDER.
JAMES LANGMUIR NAPIER.

Witnesses:
JOHN LIDDLE,
AGNES MACKINTOSH.